United States Patent [19]

Little et al.

[11] Patent Number: 5,164,883
[45] Date of Patent: Nov. 17, 1992

[54] CONTACTOR INTERLOCK

[75] Inventors: Thomas R. Little; Roger D. Kroes, both of Raleigh, N.C.

[73] Assignee: Siemens Energy & Automation, Inc., Alpharetta, Ga.

[21] Appl. No.: 731,823

[22] Filed: Jul. 12, 1991

[51] Int. Cl.⁵ .......................................... H02B 11/12
[52] U.S. Cl. ............................ 361/339; 200/50 AA; 361/343
[58] Field of Search ............. 200/50 AA, 50 A, 50 R; 361/335–339, 343–346, 391

[56] References Cited

U.S. PATENT DOCUMENTS

| | | | |
|---|---|---|---|
| 4,427,854 | 1/1984 | Kleinecke et al. | 200/50 AA |
| 4,447,858 | 5/1984 | Farag et al. | 361/339 |
| 4,513,180 | 4/1985 | Farag et al. | 200/50 R |
| 4,728,758 | 3/1988 | Farag et al. | 200/50 A |

Primary Examiner—Gregory D. Thompson

[57] ABSTRACT

A contactor interlock assembly operable with a racking arrangement for engaging and disengaging a contactor unit with a bus bar arrangement disposed relative to a contactor unit support structure. The contactor interlock assembly includes an arrangement for disabling the racking arrangement when the contactor unit is "ON." A cable connects the racking arrangement to a lever bracket supported by the support structure which is operated by a lever on the contractor unit. The lever operates the lever bracket which causes the cable to disable the racking arrangement. The interlock assembly may also include a second lever bracket associated with a second contactor unit. The second lever bracket is coupled to the first lever bracket by a cable such that the contactor units are also interlocked, such that the operation of one contactor unit is made dependent upon the operation of the other contactor unit.

8 Claims, 6 Drawing Sheets

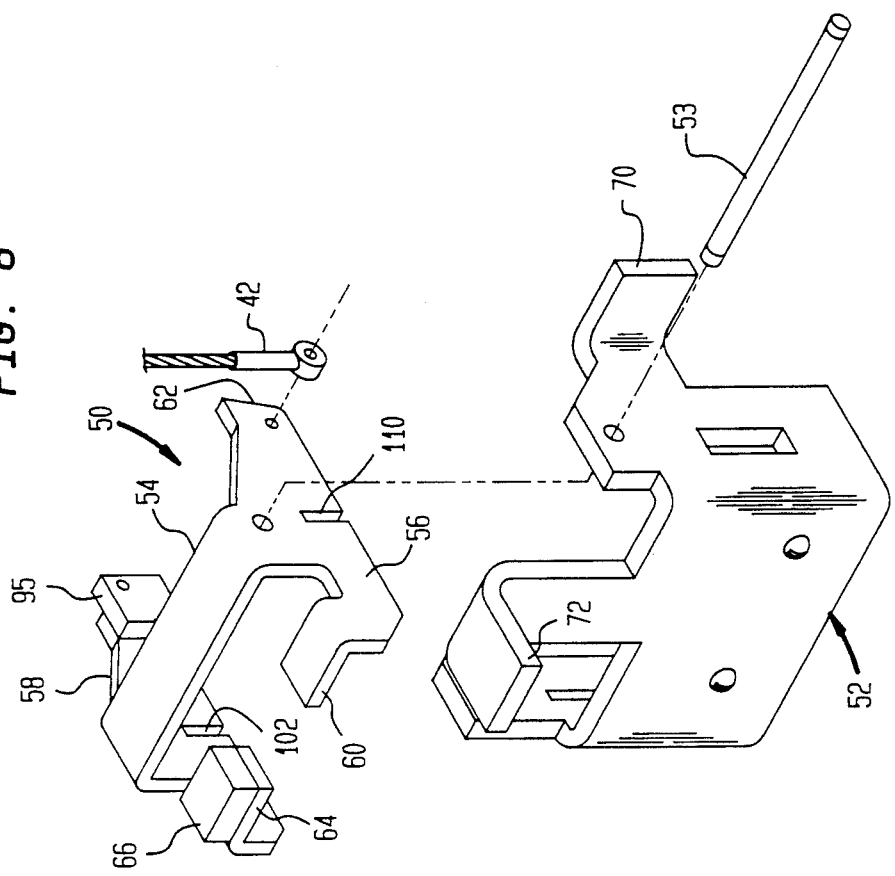
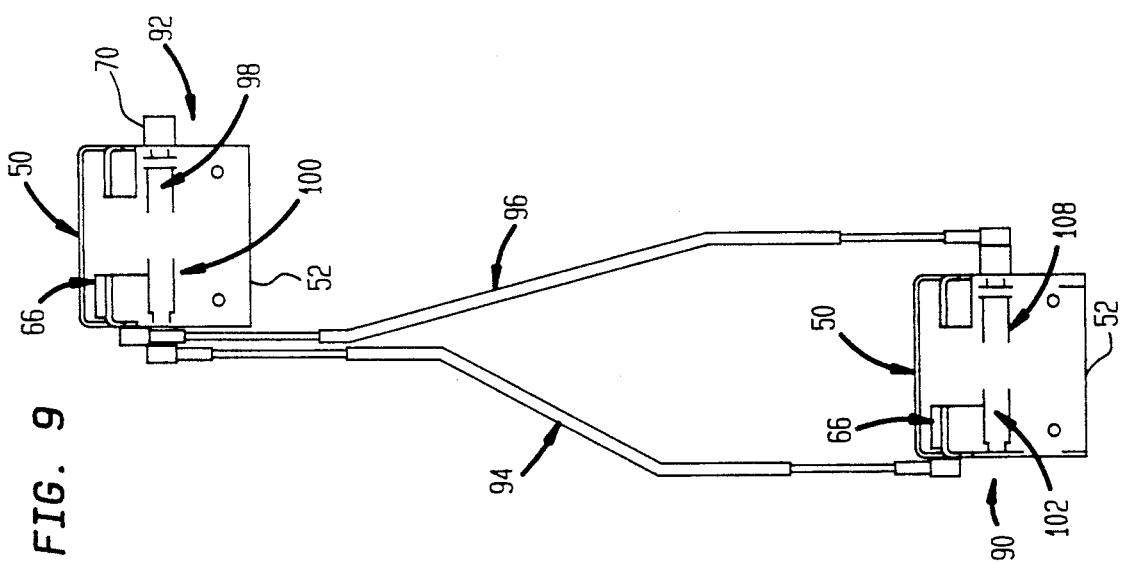

CONTACTOR INTERLOCK

FIELD OF THE INVENTION

The present invention relates to contactor support systems and more particularly to an interlock lever assembly for disabling the linkage assembly for racking the contactor carriage in the enclosure.

BACKGROUND OF THE INVENTION

Contactor unit systems of the type contemplated herein are widely used for stopping, starting and controlling the operation of large electric motors. Typical of these systems is the "Racking Mechanism For Motor Control Center" shown in U.S. Pat. No. 4,427,854 (the '854 patent), issued on Jan. 24, 1984, and assigned to the same assignee. In this system, a pair of fixed contacts are engaged by an electromagnetic driven armature. A shaft is carried by the armature to pivot an interlock lever into engagement with a notch in the bell crank to disable the linkage assembly. This system is limited in its application to a specific motor controller arrangement.

While the mechanism of the '854 patent provides a useful arrangement for racking a contactor unit, it would be useful to provide a racking interlock arrangement which may be readily adapted for use with various contactors. More specifically, it would be useful to provide components of an interlocking arrangement which may be readily arranged for use with different contactors. Additionally, it would be useful to provide a racking interlock arrangement which is also capable of interlocking two or more contactors together.

SUMMARY OF THE PRESENT INVENTION

The present invention provides an interlock assembly useable in a contactor support arrangement including a support structure and a contactor unit mounted on a carriage for movement between racked and unracked positions with respect to the support structure. A linkage assembly racks and unracks the unit, and an interlock lever assembly disables the linkage assembly when the unit is in the racked position. The interlock lever assembly includes a lever support mounted on the support structure, a lever bracket pivotally mounted on the lever support, an interlock lever mounted on the support structure in a position to disable the linkage assembly, and means for interconnecting the lever bracket to the interlock lever. The contactor unit includes means for pivoting the lever bracket with respect to the support to enable the interconnecting means to set the interlock lever in the linkage assembly.

The present invention further provides an interlock assembly useable in a contactor support arrangement including a support structure and more than one contactor unit each mounted on carriages for movement between racked and unracked positions with respect to the support structure. A linkage assembly racks and unracks each unit. In addition to interlocking the contactor units with the linkage assembly, means are provided to interlock the linkage assemblies of each contactor unit.

Other principal features and advantages of the invention will become apparent to those skilled in the art upon review of the following drawings, the detailed description and the appended claims.

BRIEF DESCRIPTION OF THE DRAWINGS

FIG. 8 is an exploded perspective view of the lever interlock assembly.

FIG. 9 is a view of a double lever interlock system for a contactor unit having two contactors.

Figure 1:
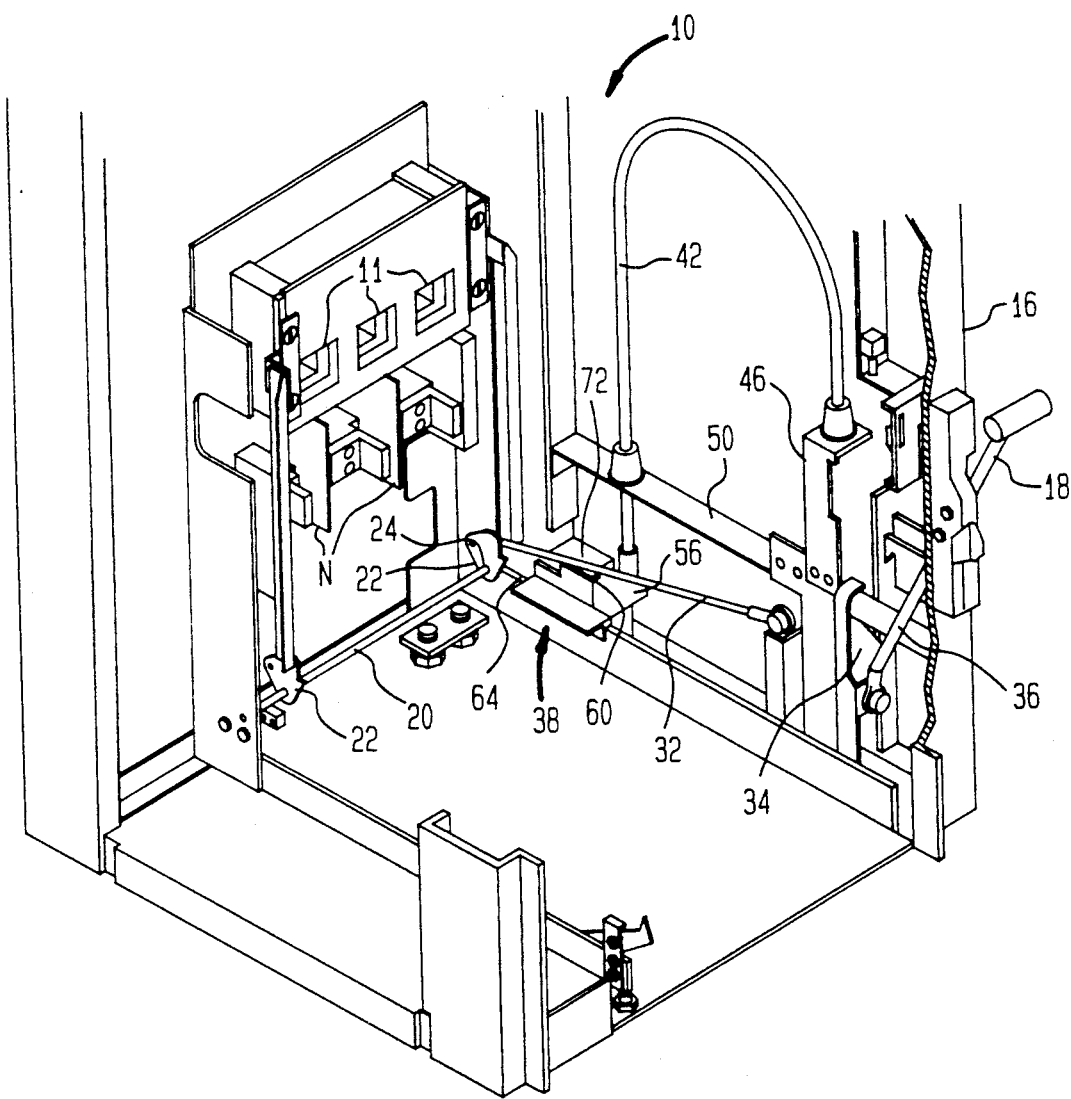
FIG. 1 is a perspective view of an enclosure for a contactor unit.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

Figure 2:
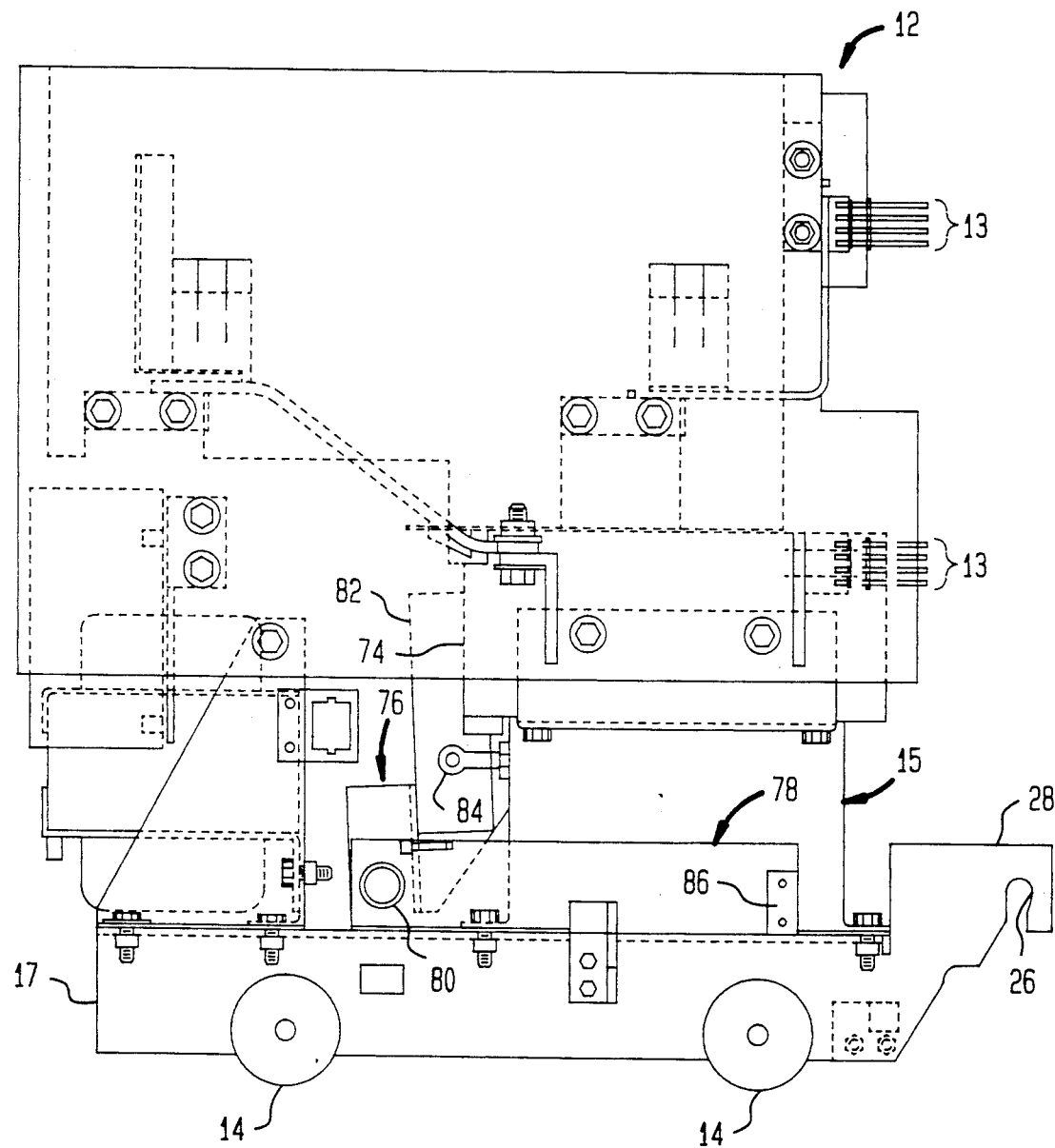
FIG. 2 is a side view of the contactor unit.
Figure 3:
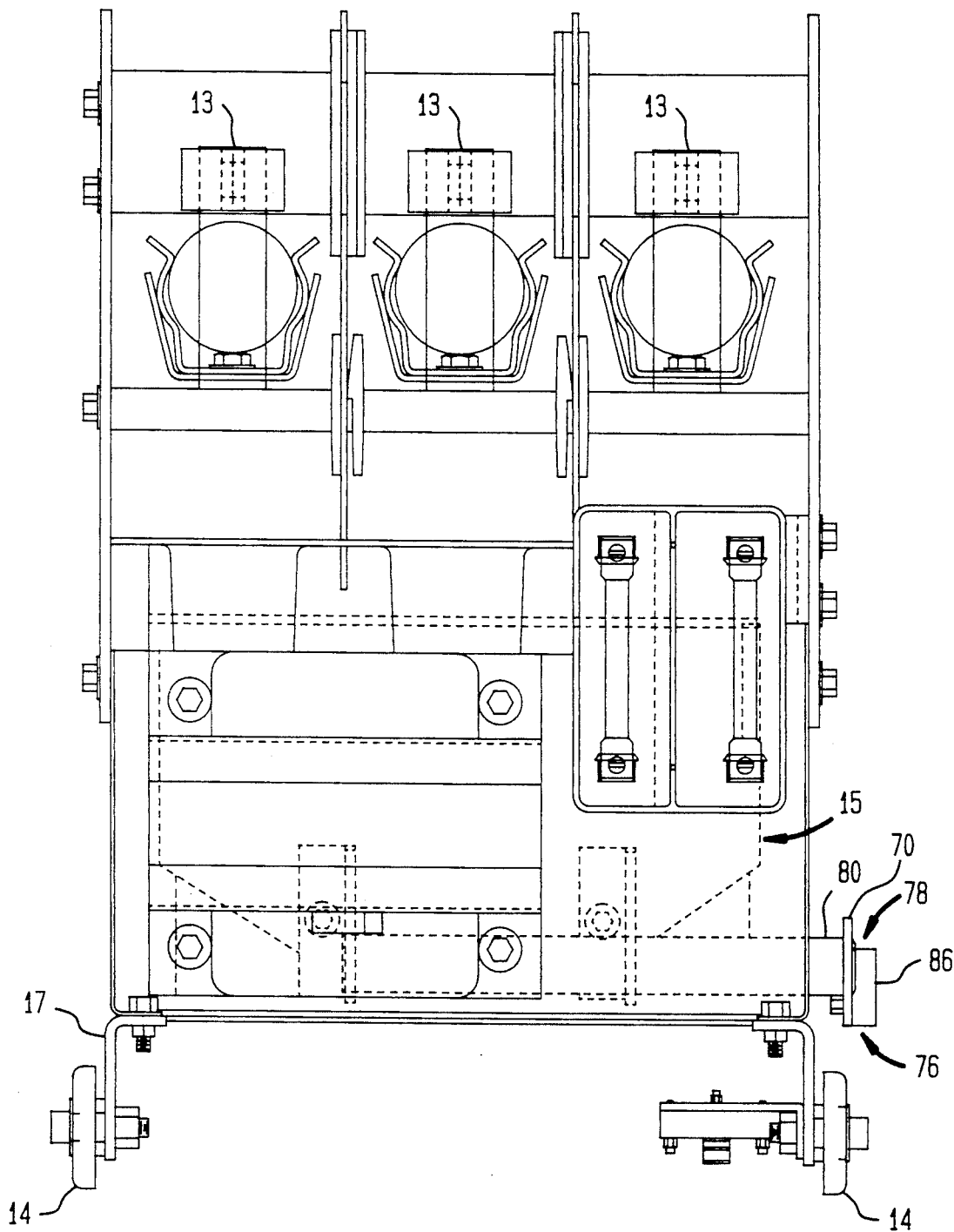
FIG. 3 is a front view of the contactor unit.

Referring to FIGS. 1, 2 and 3 of the drawings, the contactor support assembly generally includes an enclosure or support structure 10 is shown for a contactor unit 12. The contactor unit 12 is supported by a carriage 17 having wheels 14 to allow the contactor 12 to be moved in and out of the enclosure 10. The enclosure 10 includes a number of stabs 11 each associated with a bus bar at the inner end and a vertical, structural member 16 at the open end. A handle 18 is pivotally mounted on member 16 and connected to a linkage assembly 30 to rack and unrack the contactor unit 12 in the enclosure 10. The contactor unit 12 includes contact fingers 13 for engaging the stabs 11 and a vacuum contactor 15 for opening and closing the electrical circuit to the fingers 13.

A cross shaft 20 is provided in the inner end of the enclosure 10 extending transversely across the front of the carriage 17. A plate 22 is provided on each end of the shaft and includes a pin 24 which extends through a slot 26 in racking hooks 28 provided on the front of the unit 12. The shaft 20 is rotated by means of the linkage assembly 30 to rack and unrack the carriage 17 in the enclosure.

Figure 4:
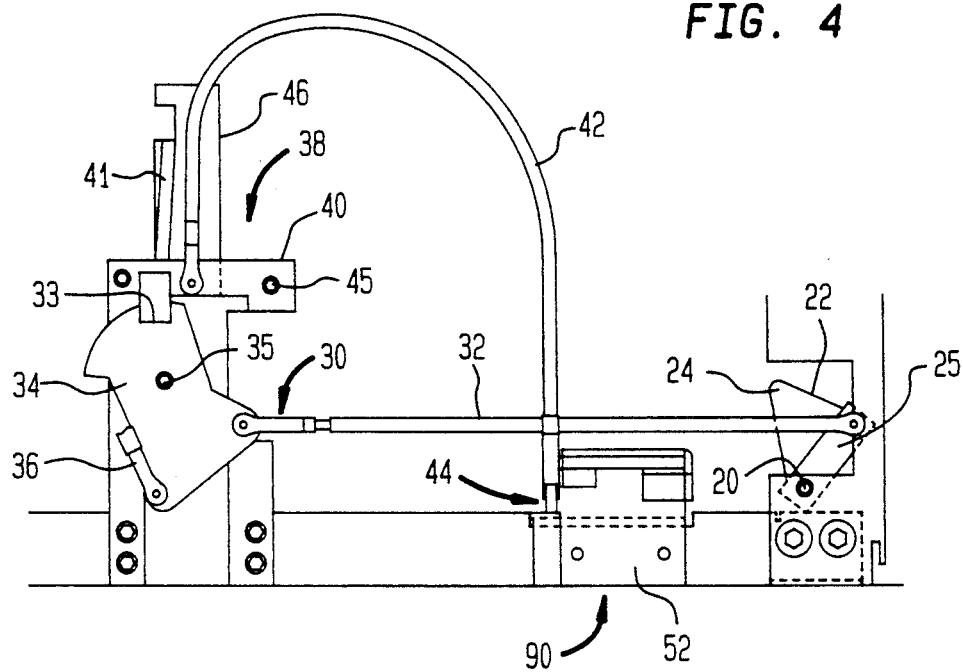
FIG. 4 is a view of the linkage assembly for racking the unit in the enclosure shown in the "ON" position.
Figure 5:
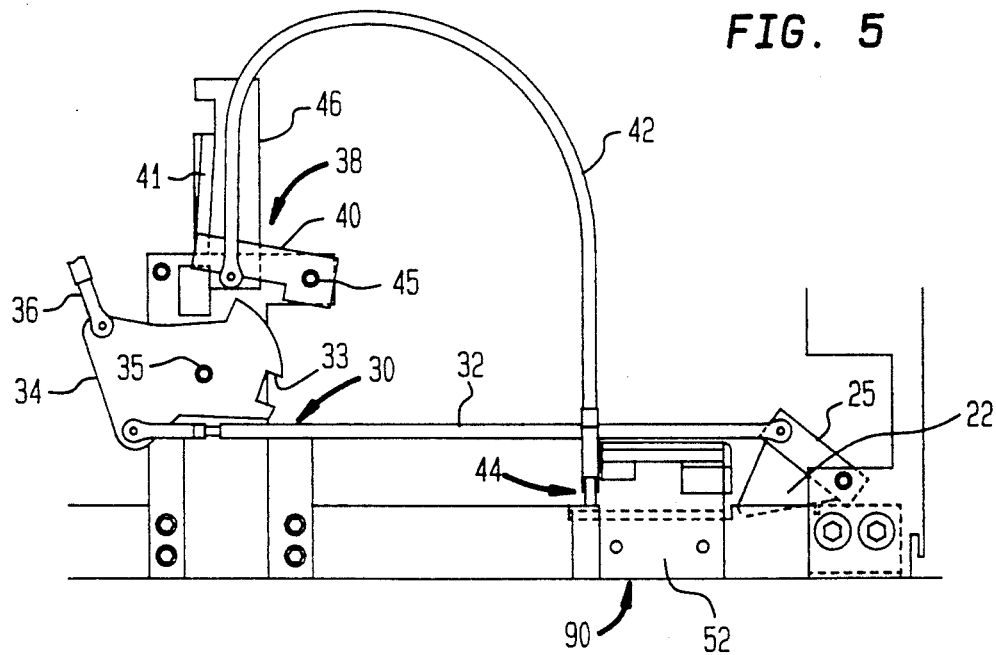
FIG. 5 is a view of the linkage assembly shown in the "OFF" position with the contactor unit unracked.

The linkage assembly 30 as shown in FIGS. 4 and 5 includes a rod 32 which is connected to the shaft 20 by a link 25 with the other end of the rod 32 connected to a bell crank 34. A second rod 36 is connected to the bell crank 34 in a spaced relation to the rod 32 and is connected to the end of the handle 18. As is generally understood the contactor unit 12 is racked into the "ON" location in the enclosure by pivoting the handle 18 upwardly to an "ON" position. The contactor unit 12 is unracked by pulling the handle 18 downward to pivot the bell crank 34 on pin 35 and rotate the shaft 20 and plates 22. The linkage assembly 30 as described herein is of a conventional configuration as shown in U.S. Pat. No. 4,427,854, issued on Jan. 24, 1984, entitled "Racking Mechanism For Motor Control Center."

In accordance with the present invention an interlock lever assembly 38 is provided on one side of the enclosure to lock the contactor unit 12 in the enclosure when the vacuum contactor 15 is closed 10. The lever assembly 38 includes an interlock lever 40, an interlock cable 42 and an interlock assembly 44. The interlock assembly 44 responds to the racking of a contactor unit 12 in the enclosure 10 to move the interlock lever 40 into engagement with a notch 33 in the bell crank 34 to thereby lock the unit 12 in position.

Figure 6:
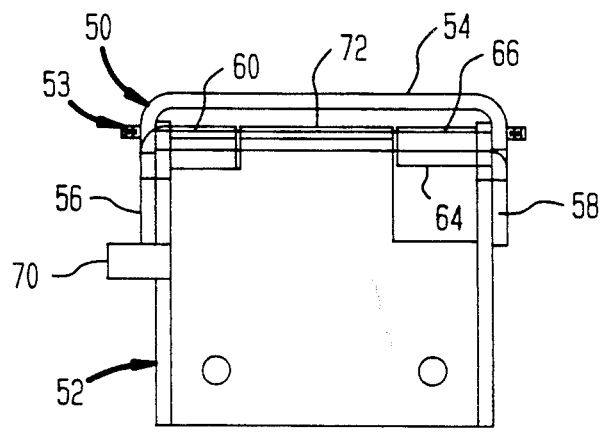
FIG. 6 is a view of the lever interlock assembly according to the invention.
Figure 7:
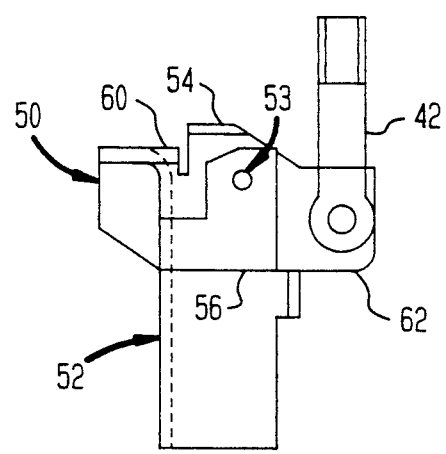
FIG. 7 is a side view of the lever interlock assembly.

In this regard, the interlock lever 40 is pivotally connected to a pin 45 in a cable interlock bracket 46 which is secured to the enclosure 10. The other end of the cable 42 is connected to a lever bracket 50 as shown in FIGS. 6, 7 and 8, which is pivotally mounted on a lever support 52 by means of a pin 53. The lever bracket 50 includes a cross member 54 having side walls 56 and 58 formed at each end. The side wall 56 includes a tab 60 and an extension 62 which is connected to the cable 42. The side wall 58 includes a tab 64 for supporting a strike plate 66. The lever support 52 includes a tab 70 which is positioned to engage the extension 62 of side wall 56 to limit the pivotal motion of the lever bracket 50. A flange 72 is mounted intermediate the ends of the lever support which is aligned with the tab 60 on the side wall 56.

The lever bracket 50 is pivoted with respect to the lever support 52 to push the cable 42 against the interlock lever 40. Referring to FIGS. 2 and 3, the carriage 12 is provided with a vacuum contactor 74 and an interlock lever assembly 76. The lever assembly 76 includes an interlock arm 78 which is mounted on the end of a shaft 80. The shaft 80 is secured to a plate 82 which is pivotally mounted on a bracket 84 on the contactor 74. A hardened steel block 86 is provided on the end of the interlock arm 78 in a position to engage striker plate 66 when the contactor unit 12 is moved into the enclosure 10.

If the handle 18 is in the "ON" position the hardened steel block 86 will be aligned with the striker plate 66 on the lever bracket 50. When the contactor 74 is closed the plate 82 is pivoted about the bracket 84, moving the interlock arm 78 downward so that the block 86 engages the striker plate 66 on the tab 64 which causes the lever bracket 50 to pivot on the lever support 52 pushing the cable 42 upward. The other end of the cable 42 moves the interlock lever 40 downward to engage the notch (slot) 33 in the bell crank 34 thus disabling the linkage assembly. The interlock lever 40 is released from the pressure of the cable when the contactor is opened by a tension spring 41 (schematically illustrated in FIGS. 4 and 5) provided between interlock lever 40 and interlock bracket 46.

Stop tab 60 is provided on the lever support 52 to prevent racking the contactor unit 12 in the event the vacuum contactor 74 is closed. In this regard, and referring to FIG. 7, if the vacuum contactor 74 is closed when the contactor unit 12 is in the unracked position, the interlock arm 78 drops down so that the block 86 is aligned with the tab 60 on lever bracket 50. If the handle 18 is moved upward to the racked or "ON" position, the block 86 will engage the tab 60 preventing any further movement of the contactor unit 12.

Referring to FIG. 9, an interlock system is shown for an arrangement having two contactor units 12, only one of which can be closed at any time. The interlock system includes two interlock assemblies 90 and 92. As shown in FIGS. 8 and 9, the bottom interlock assembly 90 is connected to the top interlock assembly 92 by cables 94 and 96. The cable 94 has one end connected to an extension 95 on side wall 58 of assembly 90. The other end is connected to a latch 100 which is pivotally connected to the inside of support 52 in assembly 92 by a pin 98. The cable 96 is connected to the extension 95 on the bracket 50 in assembly 92 and the other end to a latch 108 which is pivotally connected to the inside of support 52 in assembly 90 by a pin 102. If the bottom contactor unit is closed, the corresponding interlock arm 78 strikes the striker plate 66 in interlock assembly 90 to rotate lever bracket 50 to move cable 94 upward. The cable 94 pushes the latch 100 into a slot 102 in side wall 58 thereby preventing movement (rotation) of the bracket 50 in assembly 92. If the top contactor is closed (assuming the bottom contactor is deenergized), the corresponding top interlock arm 78 strikes the striker plate 66 in interlock assembly 92 to rotate lever bracket 50 which moves cable 96 upward to move latch 108 upward into a slot 110 in lever bracket 58 in assembly 90. It should be noted that the lever brackets 50 in assemblies 90 and 92 are each connected to the corresponding linkage assembly by cable 42 as described above.

Thus, it should be apparent that there has been provided in accordance with the present invention a contactor interlock that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

We claim:

1. In combination with a contactor support arrangement including a support structure and a contactor unit mounted on a carriage for movement between racked and unracked positions with respect to the support structure, and a linkage assembly, supported by the structure, for racking and unracking the unit, an interlock lever assembly for disabling the linkage assembly when the unit is in the racked position, said interlock lever assembly comprising:

a lever support mounted on the support structure, a lever bracket pivotally mounted on said lever support;

an interlock lever mounted on the support structure in a position to disable the linkage assembly; and means for interconnecting said lever bracket to said interlock lever, where the contactor unit includes means for pivoting said lever bracket with respect to said lever support to enable said means for interconnecting to set said interlock lever to disable the linkage assembly.

2. The combination according to claim 1 wherein said interconnecting means comprises a 42 cable.

3. In combination with a contactor support arrangement including a support structure and a contactor unit mounted on a carriage for movement between racked and unracked positions with respect to the support structure, and a linkage assembly, supported by the structure, for racking and unracking the unit, an interlock system comprising:

a first lever support mounted on the support structure;

a second lever support;

first and second lever brackets pivotally mounted on said first and second lever supports, respectively;

a latch pivotally mounted on said second lever support;

an interlock lever mounted on the support structure in a position to disable the linkage assembly associated with the contactor unit;

first means for interconnecting said first lever bracket to said interlock lever, where the contactor unit includes means for pivoting said first lever bracket with respect to said lever support to enable said means for interconnecting to set said interlock leer to disable the linkage assembly; and second means for interconnecting said first lever bracket with said latch, where said latch interferes with said second lever bracket when the linkage assembly is disabled.

4. The combination according to claim 3 wherein said first and second interconnecting means each comprise a cable.

5. The combination according to claim 1, wherein said contactor unit includes a vacuum contactor which is movable between open and closed position, said lever support assembly including means for preventing racking of the contactor unit when the vacuum contactor is closed.

6. The combination according to claim 5, wherein said pivoting means comprises an interlock arm which is pivoted to engage said lever bracket after the contactor unit is racked in the support structure.

7. The combination according to claim 6, wherein said lever bracket includes a tab and said interlock arm includes a block which is positioned to engage said tab when the vacuum contactor is closed.

8. The combination according to claim 6, wherein said lever bracket includes means positioned in the path of travel of said interlock arm when the vacuum contactor is closed to prevent racking of the contactor unit.

* * * * *